(12) United States Patent
Swann (10) Patent No.: US 11,754,001 B2
(45) Date of Patent: Sep. 12, 2023

(54) AIRCRAFT HYBRID PROPULSION SYSTEM

(71) Applicant: ROLLS-ROYCE plc, London (GB)

(72) Inventor: Peter Swann, Derby (GB)

(73) Assignee: ROLLS-ROYCE plc, London (GB)

( * ) Notice: Subject to any disclaimer, the term of this patent is extended or adjusted under 35 U.S.C. 154(b) by 182 days.

(21) Appl. No.: 17/444,133

(22) Filed: Jul. 30, 2021

(65) Prior Publication Data

US 2022/0042465 A1 Feb. 10, 2022

(30) Foreign Application Priority Data

Aug. 4, 2020 (GB) .................................... 2012078

(51) Int. Cl.
*F02C 6/14* (2006.01)
*F02C 7/36* (2006.01)
*F02C 6/20* (2006.01)
*F02C 9/00* (2006.01)

(52) U.S. Cl.
CPC .............. *F02C 7/36* (2013.01); *F02C 6/20* (2013.01); *F02C 9/00* (2013.01); *F05D 2220/323* (2013.01); *F05D 2220/76* (2013.01); *F05D 2270/01* (2013.01)

(58) Field of Classification Search
None
See application file for complete search history.

(56) References Cited

U.S. PATENT DOCUMENTS 9,376,208 B1 * 6/2016 Gentry ................. B64D 35/08
2010/0083632 A1 * 4/2010 Foster ..................... F01D 15/10
60/39.181
2015/0354464 A1 12/2015 Hillel et al.
2018/0003072 A1 * 1/2018 Lents ...................... F02C 7/36
2018/0291807 A1 10/2018 Dalal
2019/0382123 A1 12/2019 Schwarz et al.
2021/0039802 A1 * 2/2021 Chesneau ........... B64C 29/0016

FOREIGN PATENT DOCUMENTS

| EP | 3 241 753 A1 | 11/2017 |
| EP | 2971594 B1 | 1/2020 |
| EP | 3 650 350 A1 | 5/2020 |
| WO | 2014/158240 A2 | 10/2014 |

OTHER PUBLICATIONS

Jan. 4, 2022 extended Search Report issued in European Patent Application No. 21185194.4.

* cited by examiner

*Primary Examiner* — Gerald L Sung
(74) *Attorney, Agent, or Firm* — Oliff PLC (57) ABSTRACT

A control system for an aircraft hybrid propulsion system comprising a gas turbine engine coupled to an electric generator, a propulsor coupled to an electric motor, and an electrical storage device coupled to the motor and the generator. The control system configured to operate the propulsion system in a first descent mode and a second descent mode. In the first descent mode, the gas turbine engine is operated at a first engine power level and the generator is operated at a first generator power level. In the second descent mode, the gas turbine engine is operated at a second engine power level, higher than the first engine power level, and the generator is operated at a second generator power level, higher than the first generator power level. Electric power generated by the electric generator during operation in the second descent mode is stored in the electrical storage device.

11 Claims, 8 Drawing Sheets

AIRCRAFT HYBRID PROPULSION SYSTEM

CROSS-REFERENCE TO RELATED APPLICATIONS

This application claims priority pursuant to 35 U.S.C. 119(a) to United Kingdom Patent Application No. 2012078.8, filed Aug. 4, 2020, which application is incorporated herein by reference in its entirety.

FIELD OF THE DISCLOSURE

The present disclosure concerns a hybrid propulsion system for an aircraft, and an aircraft comprising the propulsion system.

BACKGROUND

Parallel and series hybrid aircraft have been proposed, in which an internal combustion engine is combined with one or more electric motors and an energy storage device to drive one or more propulsors. Parallel hybrid systems can be distinguished from so-called "series hybrid" systems, in that in a parallel hybrid system, a mechanical connection is provided between the internal combustion engine and at least one propulsor, with at least one electric motor driving either the same propulsor as that driven by the internal combustion engine, or a further propulsor. In a series hybrid system, the internal combustion engine is decoupled from the propulsors.

SUMMARY

According to a first aspect there is provided a control system for an aircraft hybrid propulsion system, the hybrid propulsion system comprising;
a gas turbine engine coupled to an electric generator;
a propulsor coupled to an electric motor; and
an electrical energy storage device coupled to the motor and the generator; wherein the control system comprising a controller configured to operate the propulsion system in one of a first descent mode and a second descent mode, wherein in the first descent mode, for a given thrust, the gas turbine engine is operated at a first engine power level and the generator is operated at a first generator power level, and in the second descent mode, for a given thrust, the gas turbine engine is operated at a second engine power level which is higher than the first engine power level, and the generator is operated at a second generator power level which is higher than the first generator power level, wherein electric power generated by the electric generator during operation in the second descent mode is stored in the electrical energy storage device.

Advantageously, the generator can be operated during descent, providing a "drag" on the gas turbine engine, while the engine can be operated at a higher power level, to maintain thrust at a given (e.g. constant or varying desired) level. This may have various advantages, including reduced noise level during descent, reduced harmful engine emissions, faster engine response times, as well as other potential advantages as set out in further detail below.

The first generator power level may be substantially zero, i.e. the generator may not be operated during the first descent mode.

The second engine power level may comprise a power level at which fewer handling bleeds are open compared to operation at the first engine power level, or where the handling bleeds are open to a lesser extent than at the first power level. By operating the engine at a higher power level during descent, several advantages may be realised. By closing one or more handling bleeds, or operating them at lesser extent, engine compression ratio is increased, thereby increasing engine thermal efficiency, and reducing engine thrust specific fuel consumption and harmful emissions such as CO and UHC. Furthermore, handling bleeds represent a material contribution to aircraft noise on descent. By operating the engine at a power setting at which the handling bleeds are closed, approach noise may be reduced materially.

The control system may be configured to determine whether to operate the propulsion system in the first descent mode or the second descent mode according to one or more of an autopilot signal, an auto-throttle signal, an altitude signal, and a flap or landing gear setting signal. Advantageously, the control system may appropriately control the engine and generator automatically during at least part of approach, without additional input from the pilot.

The control system may be configured to operate the propulsion system in the first or second descent mode depending on whether one or more requirements are met. Requirements for operating the propulsion system in the second descent mode may include health of the electric generator or energy storage system, charge state of the energy storage system, maximum c-rate of the energy storage system, load requirements of the aircraft, and thrust requirements of the aircraft.

The controller may comprise a generator controller configured to control the electric power generated by the generator, and/or may comprise a battery controller configured to control a charging rate of the energy storage device. Consequently, the controller can control electric power generated by the generator by either or both of directly controlling generator output, or by controlling generator output indirectly by controlling the load on the generator.

The energy storage device and/or the generator may be coupled to one or more additional electrical loads, such as one or more landing gear wheel motors configured to drive the landing gear wheels. Advantageously, the energy captured by the generator on descent can be used to power the aircraft during taxi and/or a subsequent take-off.

In the second descent mode, the controller may be configured to determine an engine power setting and a generator power mode which produces a demanded thrust and results in one or more of a minimum noise level, minimum emissions level, and minimum fuel consumption. For example, the controller may comprise a look-up table or model which relates engine power with one or more of noise, emissions and engine fuel consumption.

In the second descent mode, the controller may be configured to determine an engine power level and a generator power level in accordance with noise restrictions or proximity to one or more observers. For example, during one or more phase of approach, the engine may target a higher noise level relative to one or more later stages of the approach, since the perceived noise level for observers on the ground may be lower in view of the larger distance between the aircraft and the ground. Advantageously, this may allow for greater noise reductions in the later stages of approach, where noise is a greater consideration.

According to a second aspect of the invention there is provided a method of controlling an aircraft hybrid propulsion system, the hybrid propulsion system comprising;

a gas turbine engine comprising an engine coupled to an electric generator;
a propulsor coupled to an electric motor; and
an electrical energy storage device coupled to the motor and the generator; wherein the method comprises operating the propulsion system in one of a first descent mode and a second descent mode, wherein in the first descent mode, for a given thrust, the gas turbine engine is operated at a first engine power level and the generator is operated at a first generator power level, and in the second descent mode, for a given thrust, the gas turbine engine is operated at a second engine power level which is higher than the first engine power level, and the generator is operated at a generator second power level which is higher than the first generator power level, wherein electric power generated by the electric generator during operation in the second descent mode is stored in the electrical energy storage device.

According to a third aspect there is provided a non-transitory storage medium configured to carry out the method of the second aspect when installed on an aircraft hybrid propulsion system controller.

According to a fourth aspect there is provided a propulsion system comprising the control system of the first aspect.

The gas turbine engine may comprise a core spool comprising a high pressure compressor, high pressure shaft and high pressure turbine coupled together. The gas turbine engine may comprise an intermediate pressure spool comprising an intermediate pressure compressor, intermediate pressure turbine and intermediate pressure shaft coupled together.

The propulsion system may comprise a parallel hybrid propulsion system, wherein the gas turbine engine is mechanically coupled to the propulsor either directly or via a reduction gearbox. The gas turbine engine may comprise a low-pressure spool comprising the propulsor, a propulsor shaft and a low-pressure turbine coupled together. The low-pressure spool may comprise a booster compressor. The electric machine may be coupled to the low-pressure spool. Advantageously, engine high pressure spool rotational speed and/or engine intermediate pressure spool rotational speed can be controlled independently of propulsor rotational speed, thereby permitting engine power to be controlled independently of thrust to some extent.

A single electric machine may comprise both the generator mechanically coupled to the gas turbine engine, and the motor mechanically coupled to the propulsor. Advantageously, a single device can provide both functions at different points in the flight cycle. Alternatively, separate motors and generators may be provided, which may be coupled to the same or different spools of the gas turbine engine.

Alternatively, the propulsion system may comprise a series hybrid propulsion system, wherein the propulsor is mechanically decoupled from the gas turbine engine, and wherein the generator and motor comprise separate electric machines. The series hybrid propulsion system may comprise a first electric machine coupled to the propulsor and operable as an electric motor, and a second electric machine coupled to the gas turbine engine and operable as a generator. The first electric machine may be electrically coupled to the second electric machine.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION

Figure 1:
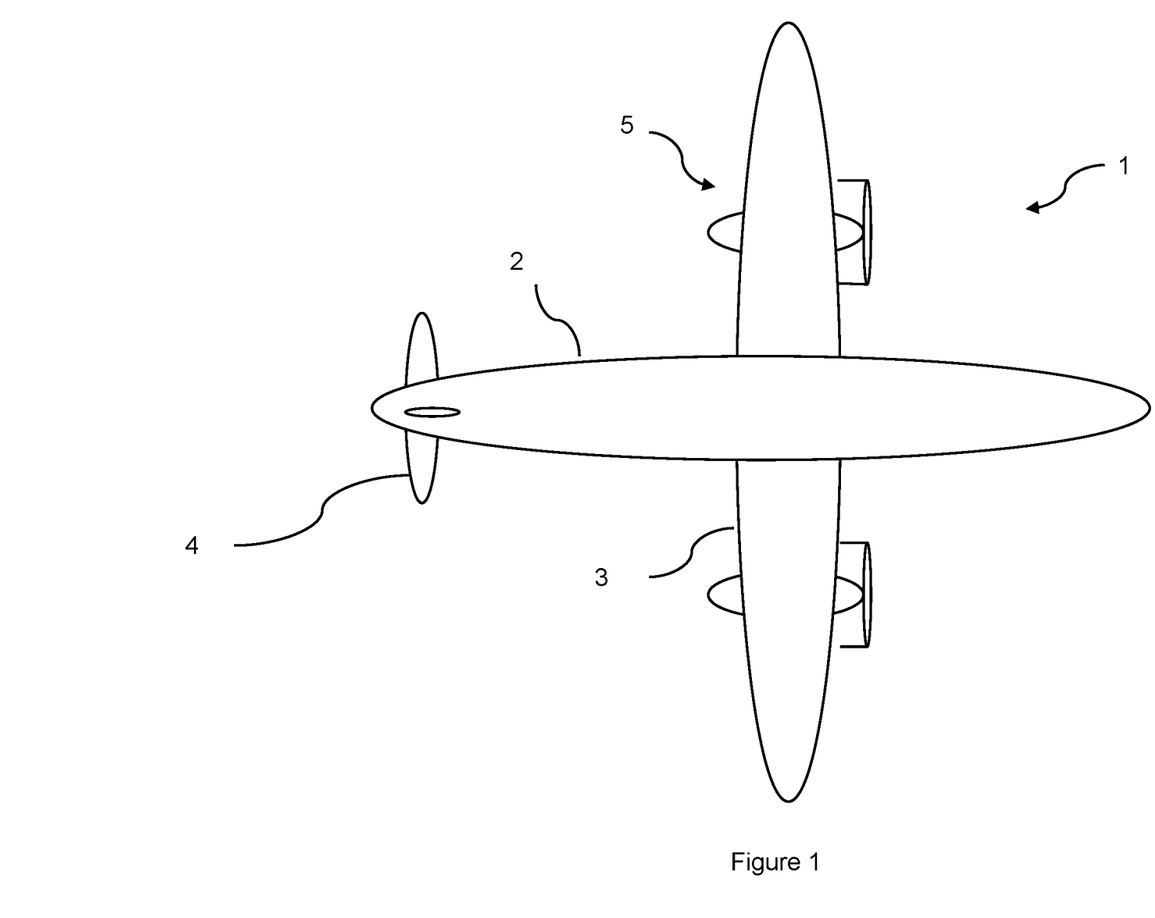
FIG. 1 is a plan view of a first aircraft comprising a parallel hybrid propulsion system.

With reference to FIG. 1, an aircraft 1 is shown. The aircraft is of conventional configuration, having a fuselage 2, wings 3, tail 4 and a pair of propulsion systems 5. One of the propulsion systems 5 is shown detail in FIG. 2.

Figure 2:
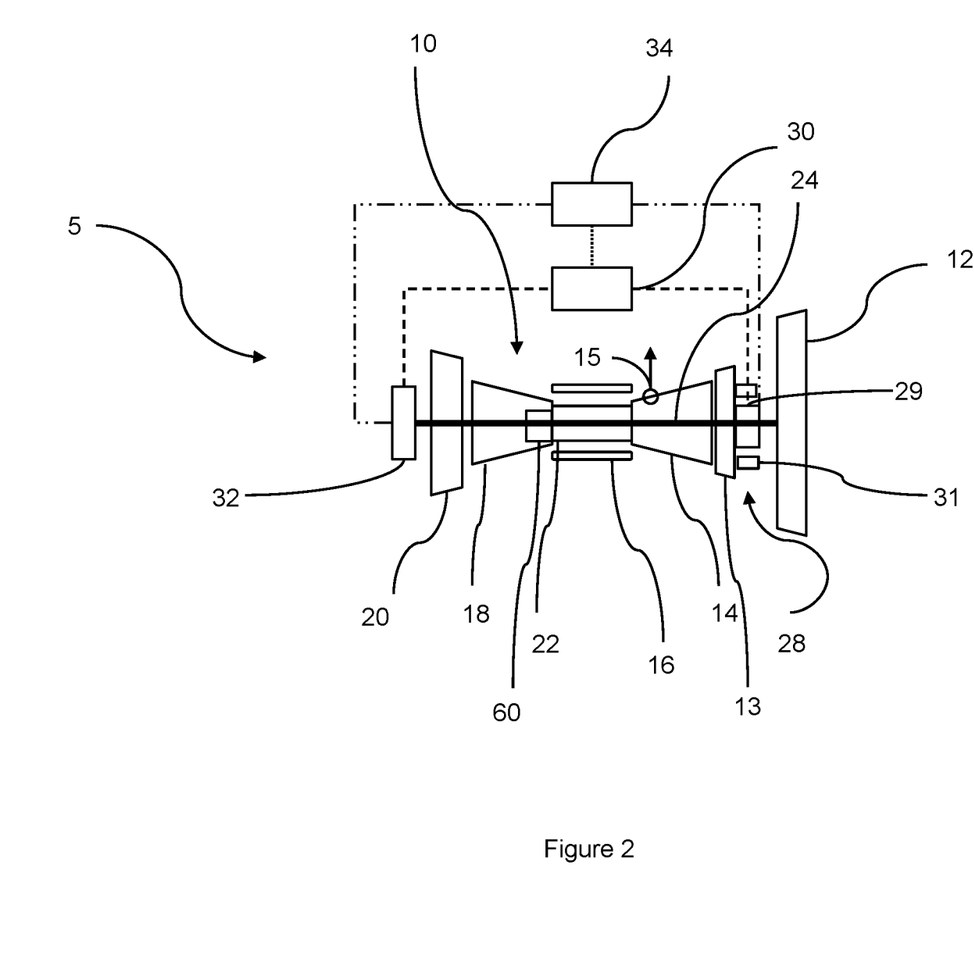
FIG. 2 is a schematic diagram of a parallel hybrid propulsion system for the aircraft of FIG. 1.

FIG. 2 shows the propulsion system 5 schematically. The propulsion system 5 includes an internal combustion engine in the form of a gas turbine engine 10. The gas turbine engine 10 comprises, in axial flow series, a propulsor in the form of a fan 12 (which may alternatively take the form of a propeller or other form of propulsor), a high-pressure compressor 14, combustion equipment 16 and high and low-pressure turbines 18, 20. Optionally, a booster compressor 13 may be provided upstream of the high-pressure compressor 14.

The gas turbine engine 10 works in the conventional manner so that air is accelerated by the fan 12 to produce two air flows: a first core air flow into the compressors 13, 14 and a second air flow which bypasses the compressors 13, 14 to provide propulsive thrust. The core air flows through the compressors 13, 14 where it is compressed, before flowing to the combustion equipment 16, where it is mixed with fuel and the mixture combusted. The resultant hot combustion products then expand through, and thereby drive, the turbines 18, 20 before being exhausted through a nozzle to provide additional propulsive thrust. The high-pressure turbine 18 drives the high-pressure compressor 14, and the low-pressure turbine 20 drives the booster compressor 13 and fan 12, each by suitable interconnecting shaft 22, 24. The compressor 14, turbine 18, and shaft 22 represent a high pressure spool. The fan 12, booster compressor 13, turbine 20 and shaft 24 represent a low-pressure spool. The compressors 13, 14 optionally comprise one or more handling bleed 15, which comprises a valve in fluid communication with the compressors 13, 14 air flow path, which allows for pressure within the respective compressor 13, 14 to be relieved by allowing flow to exit the compressor to ambient air during some operating modes.

Other gas turbine engines to which the present disclosure may be applied may have alternative configurations. By way of example such engines may have an alternative number of interconnecting shafts (e.g. two or three) and/or an alternative number of compressors and/or turbines. Further, the engine may comprise a gearbox provided in the drive train from a turbine to a compressor and/or fan. The generator may be coupled to any spool (high, intermediate or low-pressure shaft), whereas the motor is typically coupled to the low-pressure shaft, which comprises the fan/propeller. Where the engine comprises a reduction gearbox, the motor may be on either the high or low-speed side of the gearbox.

The propulsion system 5 further comprises one or more electric machines driving one or more propulsors. In particular, the propulsion system 5 comprises an electric motor-generator 28. The motor-generator 28 is of a conventional type, such as an induction or permanent magnet AC or DC brushed or brushless electric machine, and is configured to drive a propulsor such as the fan 12. In the present embodiment, the motor-generator 28 is coupled to the fan 12 via the low-pressure shaft 24. In this embodiment, the electric motor 28 is of a "core shaft mounted" type, in which a rotor 29 of the motor 28 is mounted directly to a surface of the low-pressure shaft 24, and is surrounded by a stator 31, provided radially outwardly of the rotor 29. The stator comprises electrical windings (not shown), which can be energised to produce a rotating magnetic field. This rotating magnetic field interacts with a magnetic field of the rotor 29, to cause rotation when acting as a motor. Consequently, the fan 12 may be powered by either or both of the gas turbine engine 10 via the low-pressure turbine 20, and the motor 28. The gas turbine engine 10 may comprise one or more further electric machines. For example, a further electric generator 60 is coupled to the high-pressure shaft 22. This electric generator may provide additional electric power, and may be used to power engine and aircraft non-propulsive electric systems for example, or may contribute additional electric power to power the motor 28.

The electric motor/generator 28 is coupled to an electric energy storage device 30 in the form of one or more of a chemical battery, fuel cell, and capacitor, which provides the electric motor/generator 28 with electrical power during operation as a motor, and is charged by the motor/generator 28 when operated as a generator. In some cases, multiple energy storage systems, which may be of different types (chemical battery, fuel cell etc) may be provided for each propulsion system 5. In other cases, one or more common electric energy storage devices 30 may be provided for multiple propulsion systems.

The propulsion system optionally further comprises a generator 32, which is electrically coupled to one or both of the motor 28 and the energy storage device 30, such that additional electrical energy can be provided in operation. In some cases, electric power may be transmitted directly from the generator 32 to the motor 28. The generator 32 is typically driven by the low-pressure shaft 24 of the gas turbine engine 10. The generator 32 may be coupled to the shaft 24 via a gearbox and/or clutch to allow for selectively connecting and disconnecting the generator 32 from the shaft 24. Where the generator 32 is present, the motor 28 may be operated as a motor only, and not as a generator. In other cases, the motor 28 may act as a generator, in which case the separate generator 32 may be omitted.

A controller 34 is provided, which is configured to control at least one of the motor-generator 28 and energy storage device 30, to control the torque provided/absorbed by the motor-generator 28, and the charging/discharging of the energy storage device 30. The controller 34 may also be configured to control operation of the generator 32 where provided, to control electrical power produced by the generator 32.

Figure 3:
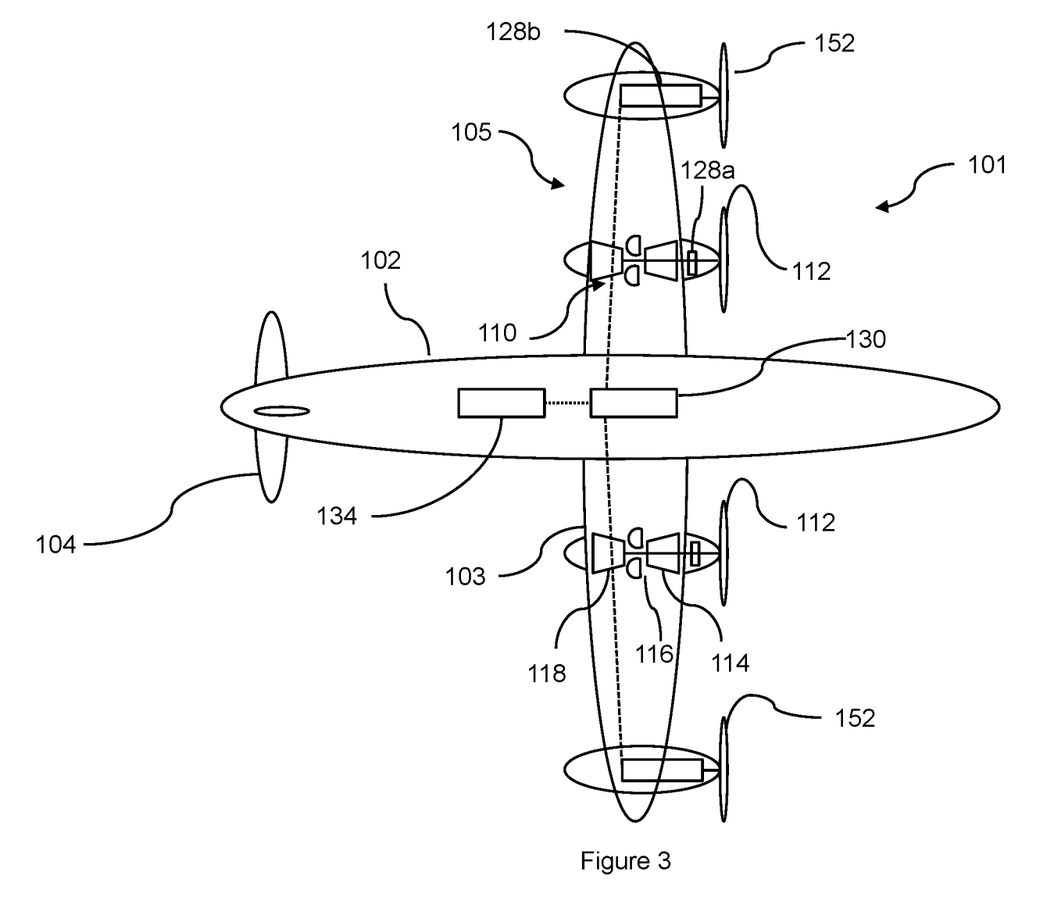
FIG. 3 is a plan view of a second aircraft comprising a parallel hybrid propulsion system.

FIG. 3 shows an alternative aircraft 101. The aircraft 101 is similar to the aircraft 1, in that the aircraft comprises a fuselage 102, wings 103, tail 104 and propulsion system 105. However, the propulsion system 105 differs from the propulsion system 5.

Each propulsion system 105 comprises a gas turbine 110 having a fan 112, compressor 114, combustor 116, high and low-pressure turbines 118 and high and low pressure shafts, configured in a similar manner to the gas turbine engine 10. The propulsion system also comprises an electric motor-generator 128a which is configured in a similar manner to the propulsion system 5, and electric motor 128b, which is mechanically coupled only to a propulsor, and is not mechanically coupled to the gas turbine engine 110.

The aircraft 101 comprises a plurality of propulsors, some of which are mechanically coupled to the gas turbine engine 110, and some of which are coupled to a respective electric motor 128a, 128b. Each electric motor 128a, 128b is coupled to an electric energy storage unit 130.

In this embodiment, a pair of first propulsors in the form of fans 112 are provided mounted to the wings 103. Each of the first pair of fans 112 is directly coupled to a shaft of a gas turbine engine 110 and motor 128a and so is mechanically driven by either or both of the respective gas turbine engine 110 and motor 128a.

The aircraft 101 further comprises a second pair of propulsors in the form of fans 152, which are mounted close to tips of the wings 103. Each of the second pair of propulsors 152 is coupled to a respective electric motor 128b, and so is driven electrically. Such a system could be described as "series-parallel", since a sub-set of the propulsors is coupled only to electric motors 128b, while a further subset is coupled to electric motors 128a and a shaft of a gas turbine engine 110.

Figure 4:
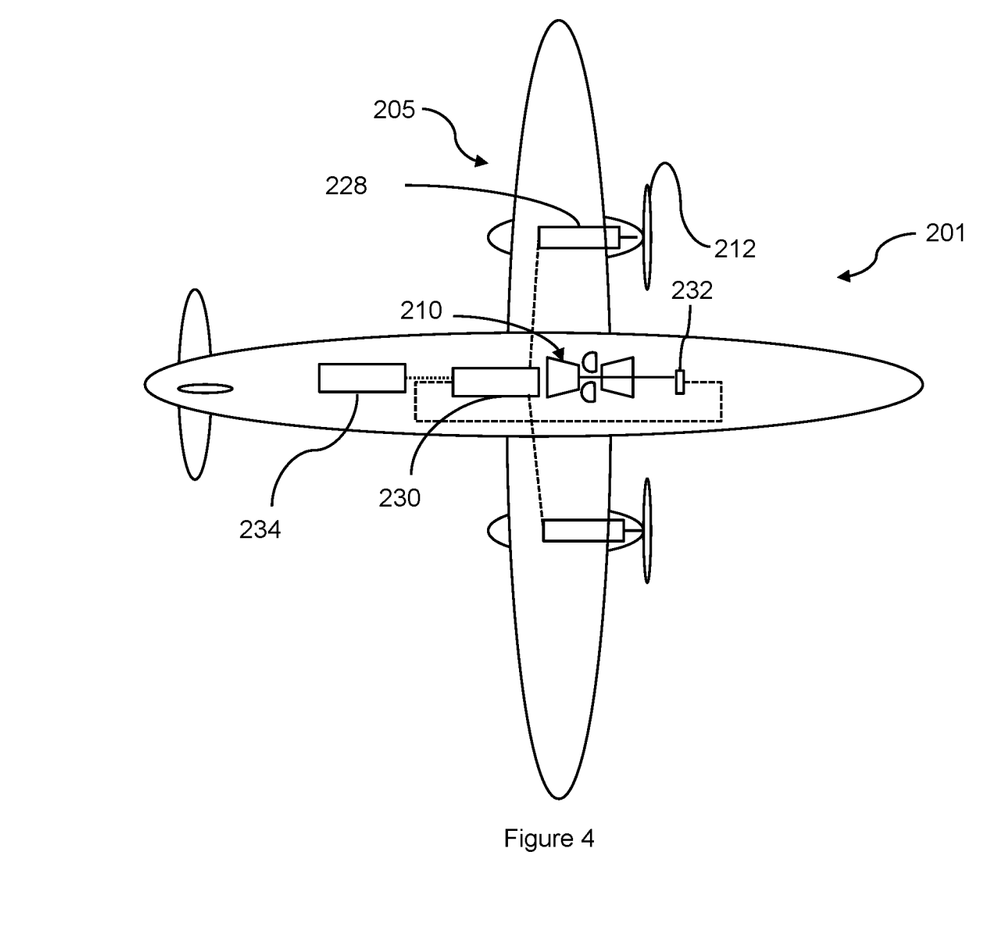
FIG. 4 is a schematic diagram of an aircraft comprising a series hybrid propulsion system.

FIG. 4 illustrates a third aircraft in the form of a series hybrid aircraft 201. In this case, a propulsion system 205 comprising a single gas turbine engine 210 is provided, though it will be understood that two or more gas turbines could be provided. A generator 232 is coupled to the gas turbine engine 210 and configured to provide electrical power to a motor 228 and an energy storage device 230. A pair of propulsors 212 are provided, each being driven by a respective electric motor 228. Each propulsor 212 is mechanically de-coupled from the gas turbine engine 210, and so the system can be described as a series hybrid aircraft. The energy storage device 230 is electrically coupled to each motor 228.

Figure 5:
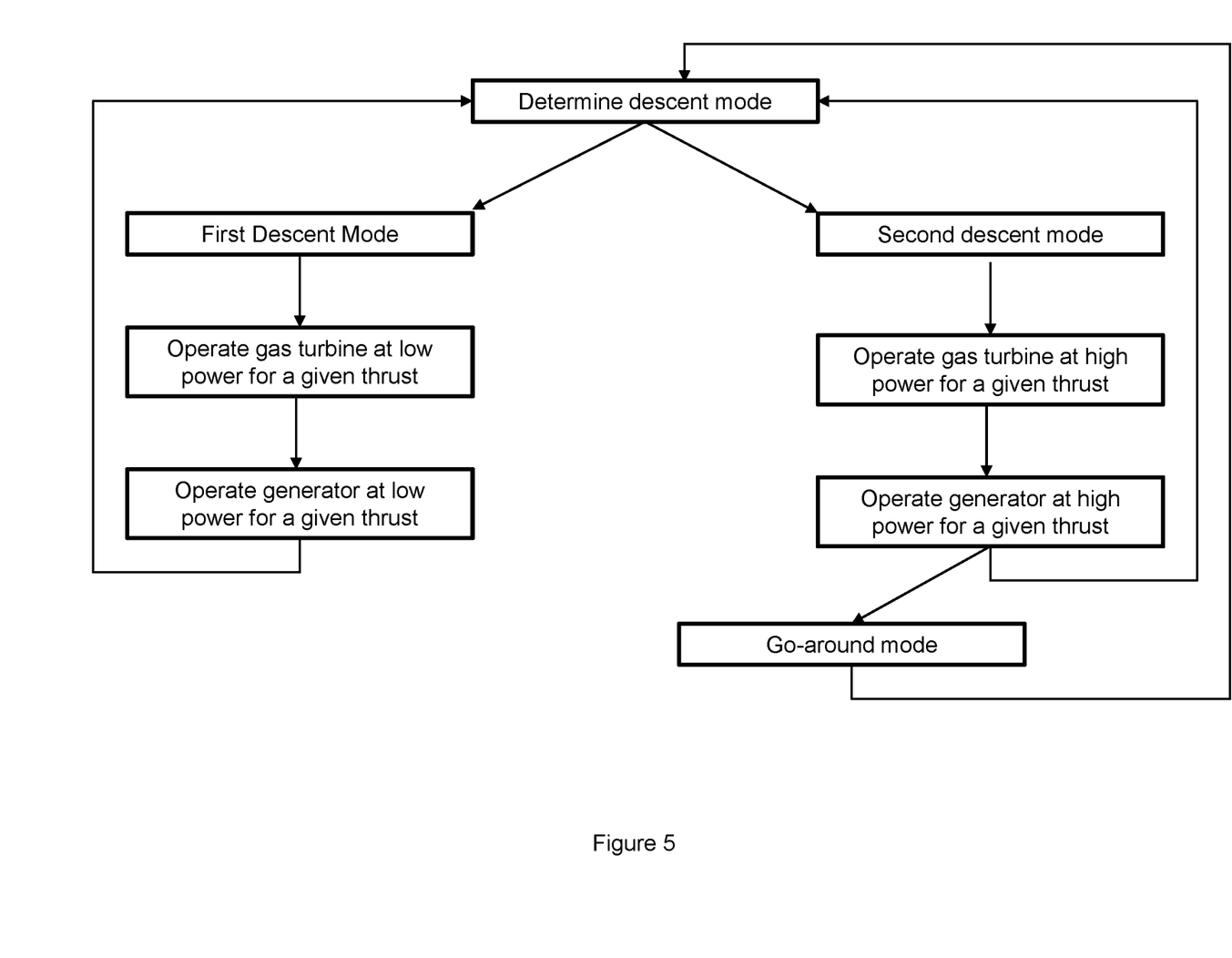
FIG. 5 is a flow diagram illustrating a general overview of a control scheme for operating the hybrid propulsion system of any of FIGS. 1 to 4.

In each aircraft, a controller 34, 134, 234 is provided, which is configured to control either or both of the energy storage device 30, 130, 230, and the generator 28, 128a, 32, 232 in accordance with a control scheme illustrated in FIG. 5.

Though several embodiments of the control scheme are described herein, a general principle is that two descent operating modes are provided for operation of the propulsion system—a first mode in which the gas turbine engine is run at a low power, and the generator is operated at low power (possibly substantially zero) for a given thrust, and a second operating mode, in which the gas turbine engine is run at a higher power than in the first operating mode, and the generator is operated at a higher power than in the first operating mode for a given thrust, i.e. may be operational to provide power, compared to being non-operational in the first mode. As will be understood, the term "descent"

normally refers to where the aircraft is descending from a higher altitude to a lower altitude, and therefore the control scheme is intended to be operable when the aircraft is in the phase of flight toward the end of a flight where the aircraft is descending.

FIG. 5 illustrates a first embodiment of this operating principle. In a first step, an operating mode is selected from one of a first operating mode in the form of a first descent mode and a second operating mode in the form of a second descent mode.

The operating mode selection may be on the basis of any one or more of pilot input, flight cycle identification, or system health identification.

For example, the system may comprise a user interface, which may permit selection of the first or second operating mode by the pilot. Alternatively or in addition, the system may comprise a module configured to identify that the aircraft is in a phase of flight in which benefits are provided by operating the aircraft in one of the first or second descent modes.

The module may be configured to identify which operating mode the system should be operated in according to one or more inputs. For example, the controller may be coupled to one or more of an air data sensor, a throttle controller, aircraft actuator sensor, auto-pilot, cockpit controls, and an engine management system. In one embodiment, the system determines that the aircraft is to be operated in the first descent mode where the throttle is within a predetermined power band (by communication with the auto-throttle), and the aircraft is within a predetermined airspeed and altitude band and/or horizontal proximity to the airport, and the aircraft is descending (by communication with the air data sensors). Similarly, the system determines that the system is to be operated in the second descent mode where the powerband, speed and altitude are within predetermined limits, and the aircraft is descending. Optionally one or more aircraft configurations may be used to determine that the system is to be operated in the second mode. For instance, the aircraft may be operated in the second mode when landing gear and flaps are extended. The pilot may be provided with an override option, forcing the system to operate in any one of the modes.

Where the system identifies that the aircraft is to be operated in the first descent mode, the controller 34, 134, 234 operates the gas turbine engine at a relatively low power setting for a given thrust setting. The required thrust setting, and so the power setting, may be determined in conjunction with the auto-throttle or auto-pilot system, such that the propulsion system provides a desired level of thrust. The electric motor 28 is operated either as a motor or as a generator at a relatively low torque level, i.e. relatively little torque is added or subtracted to the propulsor 12.

At such low gas turbine engine power levels, fuel flow is provided at a relatively low rate to the combustor 16, and the compressor operates at a relatively low rotational speed. Consequently, relatively little pressure rise and mass flow rate is provided by the compressor, and relatively low combustion temperatures are achieved.

At such low temperatures and pressures, relatively high levels of undesirable emissions may be produced by the combustor. Examples of such emissions include Unburned Hydrocarbons (UHCs) and Carbon Monoxide (CO). Such emissions are undesirable, as they may have a negative impact on air quality and health.

Additional consequences of operation at low gas turbine engine power conditions may be present. For example, at such low rotational speed, the compressor working line may move closer to a stall and/or surge condition. To alleviate these concerns, the compressor is fitted with one or more handling bleeds 15 at a high-pressure stage of the high-pressure compressor 14. These handling bleeds are opened at low power conditions, to move the compressor 14 further from stall and/or surge. In some cases, the handling bleeds have intermediate positions between open and closed, such that the mass flow through the handling bleeds can be varied. Similarly, the engine controller may schedule one or more handling bleeds to open at different engine conditions. However, operation of the handling bleeds results in high noise levels, and so overall engine noise may counterintuitively be higher at a low power setting than at a somewhat higher power setting.

As the aircraft continues on its descent, the system switches operation to the second descent operating mode. During the second descent operating mode, the gas turbine engine is operated at a higher power level for a given thrust demand, i.e. turbine power is increased by increasing fuel flow relative to operation at the lower power level at that same thrust demand. At the same time, load on the turbine 20 is increased by increasing power extracted by the generator 32, and/or by operating the motor 28 as a generator. Consequently, overall propulsion system thrust is maintained at the desired, relatively low level, while gas turbine engine power is increased, by extracting additional non-propulsive power from the turbine. This additional power is stored in the electrical energy storage device 30 for later use.

In other words, the different operating modes differ in terms of the gas turbine engine power setting required to provide a given thrust. For example, if a thrust of 10% of nominal maximum thrust is demanded by the pilot or auto-throttle, in the first mode, the controller 34 operates the engine at a power setting corresponding to 10% of maximum engine thrust when in the first operating mode, and the generator 28, 32 is inoperative. When in the second operating mode, the same thrust setting (10%) will result in an engine power setting of, say, 20%, while the actual thrust generated will be the same (10% of maximum thrust), since the generator is operated at a higher power (say, 100% of nominal power), resulting in increased drag on the associated turbine 20. This difference in engine power setting for the same thrust is provided by varying the generator load to maintain thrust at the desired setting. It will be appreciated that engine power and thrust may not have a directly linear relationship, particularly since engine thrust and power depend in part on forward speed.

At this higher thrust setting in the second descent mode, several effects are seen. Firstly, fuel flow is higher for a given thrust, and so fuel burn is increased during operation in this mode. However, overall fuel usage by the system over the flight cycle of the aircraft may not be increased, or may even be reduced, since the engine is operating at a more efficient operating point, and the additional fuel is used to charge the electrical energy storage device, which can be usefully used at a later point.

Secondly, in the second operating mode, the compressor 14 rotational speed is preferably above a predetermined speed at which one or more handling bleed 15 is normally closed. Consequently, noise is reduced. Additionally, since the high-pressure compressor 14 rotational speed is relatively high, while the booster compressor 13 speed is relatively low, the surge margin of the booster-compressor is also increased, thereby potentially allowing for closure of any handling bleeds on the booster-compressors as well. Consequently, the invention is particularly applicable to two-spool engines having booster compressors and three-spool engines having intermediate pressure compressors.

Thirdly, in view of the increased fuel flow and compressor rotational speed, the combustor temperature is increased, thereby reducing emissions of UHC and CO, in spite of the increased fuel flow. Consequently, air quality is improved.

Fourthly, since the engine is operated at a higher power for a given thrust, the engine's acceleration performance may be enhanced. Gas turbine engines typically have poor acceleration performance at low power, and so operating at a higher power for a given thrust allows the engine to accelerate more rapidly. This may provide an additional safety margin in the event of an aborted landing.

Fifthly, since the generator 28, 32 absorbs some of the engine power that would otherwise be used by the propulsor 12, overall propulsion system thrust can be reduced while maintaining higher engine power. This may allow for a steeper descent, which still further reduces noise and emissions on the ground.

Consequently, the inventive system and method of the present disclosure provides a means to efficiently reduce emissions and/or noise during a crucial part of the flight cycle in a hybrid propulsion system.

During operation, the system continually monitors the aircraft conditions, and returns the aircraft to a different operating mode when the conditions for the current operating mode are no longer met.

For example, the system may also comprise a go-around mode. In this mode, the engine is accelerated to high power, the generator is operated at low or no-power, and the energy stored in the electric energy storage device 30 is used to power the electric motor 28 to drive the propulsor 12. Consequently, improved acceleration is provided, whereby the engine is accelerated starting from a higher power condition in the second descent mode, and additional power is added by the propulsor 12. Such an increased rate of acceleration and increased power from the propulsor 12 may permit the designer to employ a smaller gas turbine engine core, or may open design freedom with respect to the compressor and/or combustor, potentially resulting in improved overall engine performance.

Several embodiments can be envisaged for how the control system chooses the correct operating mode.

In one example, the controller may take into consideration the charge level of the energy storage unit. For example, the controller may only operate the system in the second descent mode where there is sufficient storage capacity to store the energy generated by the generator in this mode.

The controller may also take into account considerations such as remaining fuel available, since operation in the second descent mode may entail increased fuel usage.

Alternatively or additionally, the controller may consider the distance of the aircraft from the ground. For example, the aircraft could be operated in the first descent mode when at relatively high altitude relative to the ground, and in the second descent mode when relatively close to the ground. In one example, a transition between first and second descent modes takes place at an altitude of around 3000 feet above the runway threshold.

The controller may operate the engine in the second, higher power mode at points in the flight cycle other than approach. For example, the system may operate at the higher power mode during taxi, to reduce noise and emissions on the ground. Alternatively, the gas turbine engines 10, 110, 210 may be shut-down when on the ground, with taxiing carried out using additional electric motors coupled to the aircraft landing gear (not shown), and/or using thrust from the propulsor 12, 112, 152, 212 driven by motor 28, 128, 228. The electrical energy stored in the storage device 30, 130, 230 may be used to power such motors.

Similarly, several embodiments for choosing the power level of the gas turbine engine and the generator during operation in the second descent mode can be envisaged.

In one example, the controller may utilise model-based control, in which the controller comprises an engine model, and which seeks to minimise a cost function comprising emissions, fuel flow, and/or noise as one or more costs, thrust as a target variable, and gas turbine engine power and generator power as manipulated variables. Consequently, gas turbine engine power and generator power are manipulated so as to minimise emissions, while producing a target thrust. The cost function may be weighted according to aircraft altitude and/or according to aircraft proximity to sensitive areas such as regions of high population density, with emissions and noise generated close to the ground and/or close to such sensitive areas receiving a higher cost weight than those generated at higher altitudes and/or greater distances.

The relevant cost that the system chooses to minimise may depend on the aircraft altitude. For example, the system may choose to minimise noise within a particular altitude band, and emissions within another altitude band.

In another example, the controller may consider the engine's bleed characteristics. For example, the controller may comprise an engine model which determines, for given flight characteristics, a minimum engine operating condition (e.g. compressor rotation speed) necessary to preclude opening one or more bleed valves. Once operated at this minimum rotational speed, the controller may vary generator power in order to provide the desired thrust, for example by Proportional, Integral, Derivative (PID) control, while maintaining the gas turbine engine at a speed at or above this minimum speed.

Figure 6:
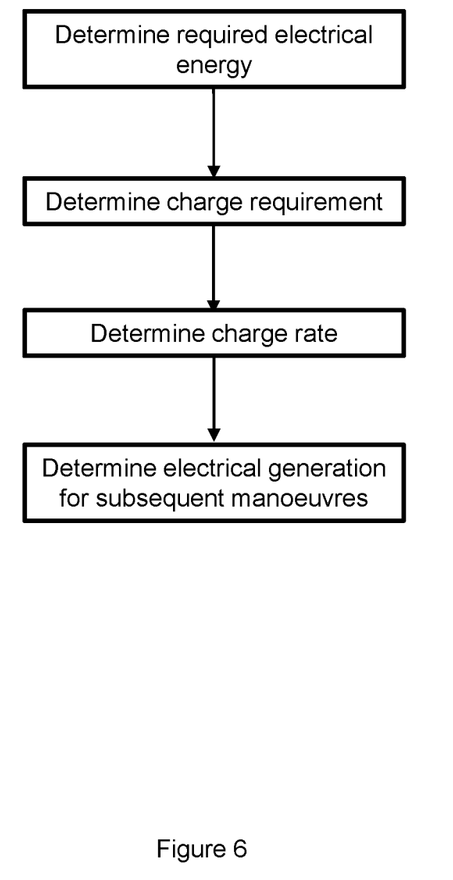
FIG. 6 is a flow diagram illustrating a first method of implementing the control scheme of FIG. 5.

In another example, the controller may control the generator 28, 32, 128a, 232 and gas turbine engine 10, 110, 210 power levels based on an electric charge requirement for later use. FIG. 6 shows one such strategy.

In a first step, the controller determines an electric energy requirement in order to carry out a required aircraft manoeuvre. For example, electric energy may be required to operate the engines in a reverse thrust mode when on the ground, or may be required for taxiing. The controller may determine the electric energy for such manoeuvres on the basis of an aircraft kinematic model, a look-up table factoring such parameters as runway length, distance to the desired gate etc, or predetermined values.

In a second step, the controller determines a health and/or charge state of the electric energy storage device 30. From this, a charge requirement is determined, by determining a delta between the electric energy requirement and the charge state.

In a third step, a time interval $\Delta T$ between the initiation of the second descent mode and the requirement for the electric energy is calculated. For instance, this may comprise an estimate of time between the second descent mode being initiated, and the commencement of the landing roll. From this, a charge rate in terms of Watts is determined by dividing the charge requirement by the time interval. It will be appreciated that other, non-constant, charge rate profiles with respect to time are also contemplated by the present disclosure, for example a charge rate profile in which the charge rate, and hence also the gas turbine power level and the generator power level, immediately prior to the landing roll is higher than that in the early stages of the second descent mode, subject to the constraint that the total quantity of charge delivered to the electric energy storage device 30 during the second descent mode is equal to or no less than the charge requirement determined in the second step.

In a fourth step, the gas turbine engine 10, 110, 210 power and generator 28, 32, 128a, 232 power is controlled to achieve during a period of operation in the second descent mode the target charge rate profile and/or the overall charge requirement determined in the second step, while maintaining both powers within predetermined limits. For instance, the gas turbine engine may be operated above the minimum level required to prevent operation of one or more of the bleed valves, as disclosed above. The generator 28,32 may be operated below a nominal maximum C rate of the energy storage device 30 and below the rated torque and/or power limits of the generator 28,32. The thrust must be maintained at the target value. Within these constraints, the engine may be operated at a level that results in minimal fuel burn and/or a minimised overall cost additionally comprising costs related to noise and/or emissions. Once on the ground, this energy is utilised for ground manoeuvres, as discussed previously.

Figure 7:
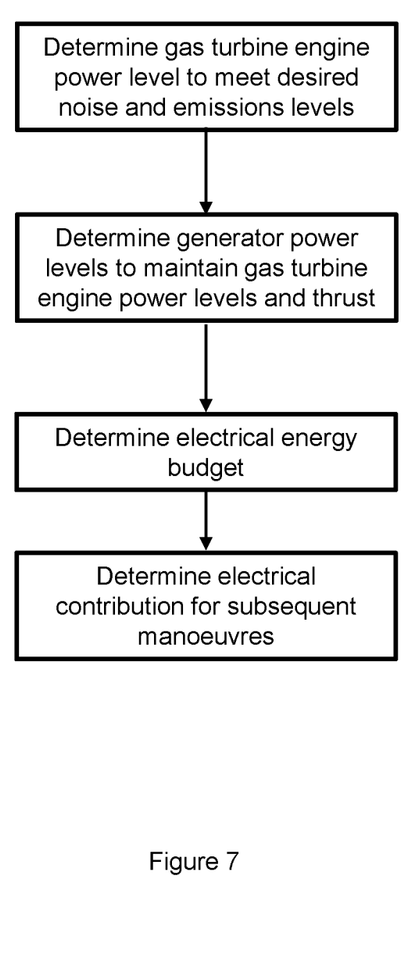
FIG. 7 is a is a flow diagram illustrating a second method of implementing the control scheme of FIG. 5.

FIG. 7 describes a second method for determining generator 28,32 and gas turbine engine 10 power levels based on desired noise and emissions outcomes.

In a first step, the controller determines a gas turbine engine power level profile in order to meet a desired reduction profile of emissions or noise during approach. For example, as discussed above, the emissions or noise generated by the engine 10 may vary according to power level. The controller may determine the emissions or noise associated with various power levels on the basis of an engine emissions or noise model, a look-up table factoring such parameters as compressor rotational speed, gas path inlet or outlet temperature and associated noise and emissions, or predetermined values.

In a second step, the controller determines generator power levels that meet the desired thrust level, while maintaining the gas turbine engine at the desired power level.

In a third step, the controller determines the energy budget available to the electric motor at the end of the approach phase, by integrating the projected generator power level over time, and adding this to the existing energy stored by the energy storage device.

In a fourth step, the controller calculates a strategy for using the energy budget during subsequent aircraft manoeuvres, such as a go-around, reverse thrust or taxiing.

Figure 8:
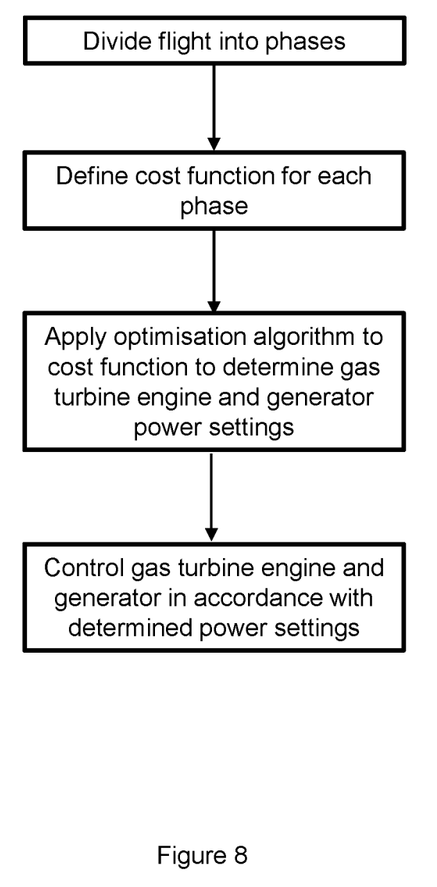
FIG. 8 is a is a flow diagram illustrating a third method of implementing the control scheme of FIG. 5.

FIG. 8 describes a third method of determining generator 28, 32 and gas turbine engine 10 power levels by employing multi-parameter optimisation methods to determine choices and/or values for gas turbine engine and generator power.

In a first step, the planned flight is divided into a number of phases, comprising phases where emissions, noise and possibly other factors are prioritised, or are assigned relative weightings, as described above.

For each phase, a cost function is defined, which includes fuel costs, one or more emissions costs (e.g. a combined cost or separate costs for UHCs, CO etc), noise costs, and appropriate weightings. Each of these costs is assigned a value based on an engine model for a corresponding flight parameter.

In a third step, an optimisation algorithm is performed for the cost function. The optimisation algorithm seeks to minimise the corresponding parameter selected during the respective flight phase in the first step. The algorithm may include system limits based on known component limits, such as maximum generator torque and/or power output at a given engine condition, maximum energy storage unit charging rates, etc. This algorithm produces gas turbine and electric generator powers necessary to produce the required thrust with the corresponding minimum cost.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, the engine could be of a three-spool, two-spool, or single-spool type, and may comprise a reduction gearbox, or may be of the direct-drive type. The electric generator may be coupled to any one of these shafts. Several electric generators may be provided.

Separate control units may be provided for controlling each of the motor, generator, electric storage units, gas turbine engine and aircraft. Alternatively, one or more of these functions may be performed by a single controller. A single controller could be provided to control all engines, or individual engines could be controlled by respective controllers.

In general, the control method for the parallel-hybrid and series hybrid cases are similar. However, there may be differences in some details. For example, where the propulsion system comprises a series-hybrid, it may be necessary to operate the generator to at least some extent at all times, to provide a load to the turbine, whereas the generator may be switched off entirely (i.e. be configured to produce substantially no electric power) in a parallel-hybrid system, since the propulsor provides a load.

The invention claimed is:

1. A control system for an aircraft hybrid propulsion system, the aircraft hybrid propulsion system comprising: a gas turbine engine coupled to an electric generator; a propulsor coupled to an electric motor; and an electrical energy storage device coupled to the motor and the generator; the control system comprising:
   a controller configured to operate the propulsion system in one of a first descent mode and a second descent mode,
   in the first descent mode, for a given thrust, the gas turbine engine is operated at a first engine power level and the generator is operated at a first generator power level,
   in the second descent mode, for the given thrust, the gas turbine engine is operated at a second engine power level which is higher than the first engine power level, and the generator is operated at a second generator power level which is higher than the first generator power level,
   electric power generated by the electric generator during operation in the second descent mode is stored in the electrical energy storage device, and
   the second engine power level comprises a power level at which fewer handling bleeds are open compared to operation at the first engine power level, or where the handling bleeds are open to a lesser extent than at the first engine power level.

2. A control system according to claim 1, wherein the first generator power level is substantially zero.

3. A control system according to claim 1, wherein the control system is configured to determine whether to operate the propulsion system in the first descent mode or the second descent mode according to one or more of an autopilot signal, an auto-throttle signal, an altitude signal, and a flap or landing gear setting signal.

4. A control system according to claim 1, wherein the control system is configured to operate the propulsion system in the first or second descent mode based upon one or more requirements being met, wherein the requirements for operating the propulsion system in the second descent mode include health of the electric generator or energy storage system, charge state of the energy storage system, maximum c-rate of the energy storage system requirements of the aircraft, and thrust requirements of the aircraft.

5. A control system according to claim 1, wherein the controller comprises one or more of a generator controller configured to control the electric power generated by the generator, and a battery controller configured to control a charging rate of the energy storage device.

6. A control system according to claim 1, wherein the controller is configured to determine an engine power setting and a generator power mode which produces a demanded thrust and results in one or more of a minimum noise level, minimum emissions level, and minimum fuel consumption.

7. A control system according to claim 1, wherein in the second descent mode, the controller is configured to determine an engine power level and a generator power level in accordance with noise restrictions or proximity to one or more observers.

8. A propulsion system comprising the control system of claim 1.

9. A propulsion system according to claim 8, wherein the propulsion system comprises the hybrid propulsion system, wherein the gas turbine engine is mechanically coupled to the propulsor either directly or via a reduction gearbox and the hybrid propulsion system is a parallel system.

10. A propulsion system according to claim 8, wherein the propulsion system comprises the hybrid propulsion system, wherein the propulsor is mechanically decoupled from the gas turbine engine, and wherein the generator and motor comprise separate electric machines and the hybrid propulsion system is a series system.

11. A method of controlling an aircraft hybrid propulsion system, the hybrid propulsion system comprising a gas turbine engine coupled to an electric generator; a propulsor coupled to an electric motor; and an electrical energy storage device coupled to the motor and the generator, the method comprising:

operating the propulsion system in one of a first descent mode and a second descent mode, wherein in the first descent mode, for a given thrust, the gas turbine engine is operated at a first engine power level and the generator is operated at a first generator power level, in the second descent mode, for the given thrust, the gas turbine engine is operated at a second engine power level which is higher than the first engine power level, and the generator is operated at a second generator power level which is higher than the first generator power level, electric power generated by the electric generator during operation in the second descent mode is stored in the electrical energy storage device, and the second engine power level comprises a power level at which fewer handling bleeds are open compared to operation at the first engine power level, or where the handling bleeds are open to a lesser extent than at the first engine power level.

* * * * *